(No Model.) 2 Sheets—Sheet 2.
L. R. FAUGHT.
Machine for Boring Metal.
No. 241,483. Patented May 17, 1881.
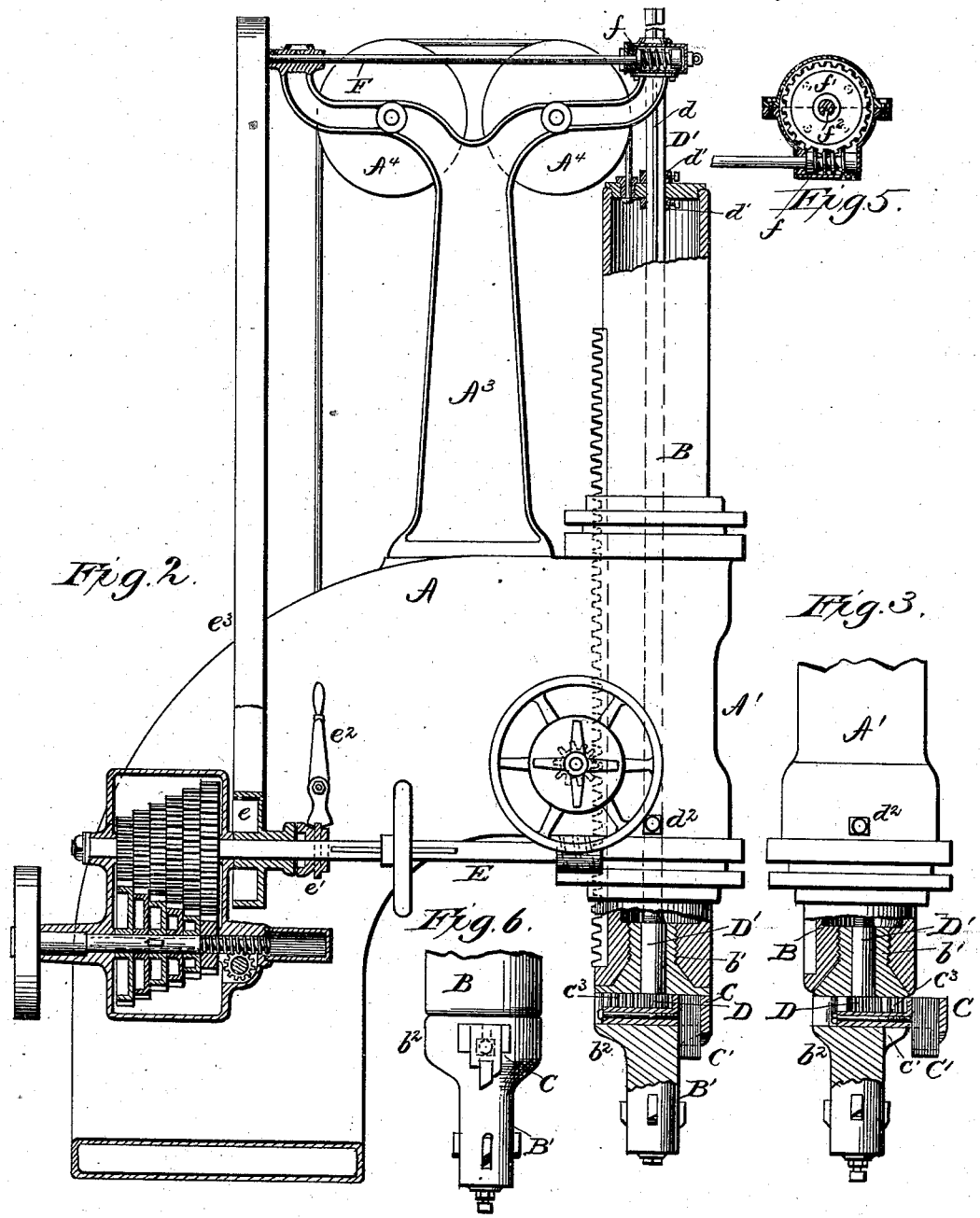
Witnesses.
Geo. B. Collier
Wm. E. Morgan
Inventor.
L. R. Faught,
by Collier & Bell,
Attys.

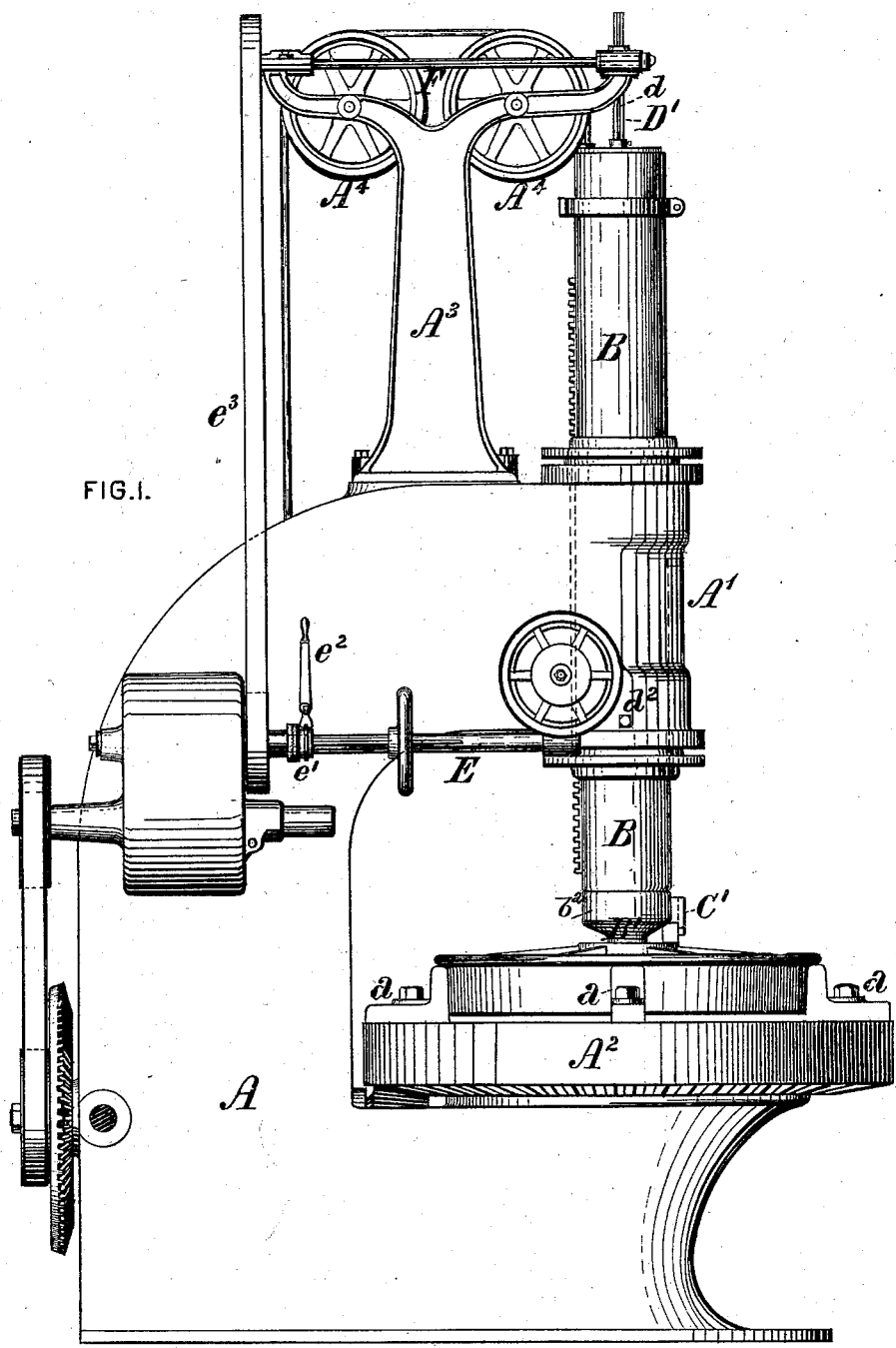

UNITED STATES PATENT OFFICE.

LUTHER R. FAUGHT, OF PHILADELPHIA, PENNSYLVANIA.

MACHINE FOR BORING METAL.

SPECIFICATION forming part of Letters Patent No. 241,483, dated May 17, 1881.

Application filed November 15, 1880. (No model.)

*To all whom it may concern:*

Be it known that I, LUTHER R. FAUGHT, of the city and county of Philadelphia, in the State of Pennsylvania, have invented certain new and useful Improvements in Machines for Boring Metal, of which improvements the following is a specification.

The object of my invention is to provide, in a boring-machine, an automatic cross-feed for a shouldering or facing cutter—that is to say, to feed a cutter in a line at a right angle to the axis of the boring-bar.

To this end my improvements consist in the combination of a tool-holder, located in and having the capacity of movement transversely to the boring-bar, a rack on said tool-holder, and a pinion upon a shaft passing centrally through the boring-bar and its spindle. Further, in combining with feeding devices, as aforesaid, mechanism whereby rotation may be imparted to the pinion-shaft from a rotating element of the machine. The improvements claimed are hereinafter more fully set forth.

In the accompanying drawings, Figure 1 is a side view, in elevation, of a vertical boring-machine embodying my invention; Fig. 2, a similar view, on an enlarged scale, of a portion of the same with the feed-gearing and portions of the spindle and boring-bar in central section; Fig. 3, a vertical central section through portions of the spindle and boring-bar, showing the cutter as farther protruded from the axis of the bar than in Fig. 2; Fig. 4, a horizontal section through the boring-bar and tool-holder; Fig. 5, a horizontal section through the case of the worm and worm-wheel by which the pinion-shaft is rotated; and Fig. 6 a side view, in elevation, of the boring-bar.

The machine in which I have shown my improvements as applied is one of known and approved construction, having on the upper portion of its frame A a box or bearing, A', in which a hollow spindle, B, is mounted, with the capacity of vertical movement and adjustment above and concentrically with a table, $A^2$, upon which the article to be operated upon is secured by jaws or clamps $a$, and which is rotated by gearing in the usual manner.

A boring-bar, B', is secured, preferably, by a threaded stem or prolongation, $b'$, upon its upper end, to the lower end of the spindle B, adjacent to which a cylindrical head or enlargement, $b^2$, is formed upon it, the diameter of said head being about equal to or slightly less than that of the spindle B. A diametric slot of rectangular cross-section is formed in the head $b^2$ of the boring-bar, and a steel block or tool-holder, C, of similar section, is fitted neatly in said slot, so as to slide easily therein in a plane perpendicular to the axis of the bar B', the length of said tool-holder being equal, as nearly as may be, to the diameter of the head $b^2$.

A vertical tool or cutter, C', is secured in a slot in the tool-holder C, and is clamped therein by a set-screw, $c'$.

The details of construction of the tool-holder C, (saving as presently to be described,) and the relation thereof to the cutter and the enlarged slotted head of the boring-bar, have been fully set forth by me in another application for Letters Patent of even date herewith, and need not, therefore, be herein described with greater particularity.

A longitudinal recess, $c^2$, is formed in the tool-holder C, extending from the end thereof farthest from the cutter to a point beyond its center, and a rack or series of vertical teeth, $c^3$, is formed upon one side of said recess. A pinion, D, of suitable diameter and pitch to mesh with said rack is formed upon the lower end of a vertical shaft, D', which passes centrally through that portion of the boring-bar above the slot in which the tool-holder slides, said shaft fitting the central orifice of the boring-bar, so as to turn freely therein, and extending centrally through the spindle to a point sufficiently above the same to enable the application of suitable rotating mechanism to be conveniently made in such manner that the same may be operative at all points in the traverse of the spindle. The pinion-shaft D' is adjusted and maintained in proper relation, vertically, to the boring-bar and spindle by collars $d'$, secured upon it by set-screws above and below the cap of the spindle.

It will be obvious that by the rotation of the shaft D' and pinion D the tool-holder C will be moved longitudinally within the slot of the enlarged head of the boring-bar, and will traverse the cutter C' toward or from the axis of the boring-bar, (correspondingly varying the diameter of the cut,) according as the shaft D' is revolved in one or the other direction. In the instance shown the pinion-shaft D' is rotated from the feed-shaft E, by which the vertical feed of the spindle and boring-bar is effected.

A pulley, $e$, is mounted loosely upon the shaft E, and may be made fast thereon at pleasure, so as to rotate therewith, by a clutch, $e'$, and clutch-lever $e^2$. A belt, $e^3$, passes around the pulley $e$, and around a pulley on one end of a horizontal shaft, F, mounted in bearings supported by the post $A^3$ of the counterbalance-sheaves $A^4$. The opposite end of the shaft F carries a worm, $f$, which engages the teeth of a worm-wheel, $f'$, having an internal key or feather, $f^2$, on its hub, which feather enters a longitudinal groove, $d$, cut in the pinion-shaft D', and thereby insures the rotation of said shaft with the worm-wheel $f'$, while admitting of the free vertical movements of the shaft within it occasioned by the vertical traverse of the spindle, so that rotation may be imparted to the pinion-shaft at any and all points in said traverse, and during the movement of the spindle, as well as when it is at rest. The spindle may be held stationary, when required, by a set-screw, $d^2$, passing through the box A'.

I have described and shown the pinion-shaft as being rotated intermediately from the feed-shaft, for the reason that in a boring-machine of the class herein illustrated such arrangement is a convenient and desirable one. I do not, however, desire to limit myself to such specific driving mechanism, as it will be obvious that other means of imparting rotation to the pinion-shaft may be adopted without departing from the spirit of my invention, and in machines differing in construction from that shown may be found more desirable.

I claim as my invention and desire to secure by Letters Patent—

1. In a boring-machine, the combination, substantially as set forth, of the following elements: a boring-bar having a diametrically-slotted head, a tool-holder carrying a vertical tool and fitting in the slot of said head with the capacity of movement transversely to the boring-bar, and provided with a longitudinal rack formed within a recess of said tool-holder, and a pinion upon a shaft passing centrally through the boring-bar and its spindle and engaging with the rack of the tool-holder.

2. In a boring-machine, the combination, substantially as set forth, of the following elements: a transversely-slotted boring-bar, a tool-holder supporting a vertical tool and fitting freely in the slot of said bar, and having a rack formed within a recess thereof, parallel with said slot, a pinion-shaft passing centrally through the boring-bar and spindle and carrying a pinion engaging the rack of the tool-holder, and gearing whereby rotation in either direction may be imparted to the pinion-shaft regardless of changes of position of the boring-bar and spindle.

3. In a boring-machine, the combination, substantially as set forth, of the feed-gear shaft, with its loose pulley and clutch, the upper horizontal shaft driven from said feed-gear shaft and carrying a worm upon one of its ends, the worm-wheel gearing with said worm, the pinion-shaft passing centrally through the spindle and boring-bar and operated by said worm-wheel, the transversely-slotted boring-bar, and the tool-holder fitting freely in the slot of said bar, and having a rack meshing with a pinion on the lower end of the pinion-shaft.

L. R. FAUGHT.

Witnesses:
J. SNOWDEN BELL,
WALTER S. GIBSON.